US011868079B2

(12) United States Patent
Tomioka et al.

(10) Patent No.: US 11,868,079 B2
(45) Date of Patent: Jan. 9, 2024

(54) LATCH MECHANISM, LATCH DEVICE, AND IMAGE FORMING APPARATUS

(71) Applicant: FUJIFILM Business Innovation Corp., Tokyo (JP)

(72) Inventors: Kota Tomioka, Kanagawa (JP); Shinya Hasegawa, Kanagawa (JP); Hiroyuki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/869,765

(22) Filed: Jul. 20, 2022

(65) Prior Publication Data

US 2023/0161287 A1 May 25, 2023

(30) Foreign Application Priority Data

Nov. 19, 2021 (JP) ................................ 2021-188946

(51) Int. Cl.
*G03G 21/16* (2006.01)
*G03G 15/00* (2006.01)
*E05C 9/04* (2006.01)

(52) U.S. Cl.
CPC ......... *G03G 21/1633* (2013.01); *E05C 9/048* (2013.01); *G03G 2215/00544* (2013.01)

(58) Field of Classification Search
CPC .......... G03G 21/1633; G03G 21/1638; G03G 2215/00544; G03G 2221/1675; E05C 9/04; E05C 9/048
See application file for complete search history.

(56) References Cited

U.S. PATENT DOCUMENTS

| | | | | |
|---|---|---|---|---|
| 10,114,332 | B2 | 10/2018 | Takahashi et al. | |
| 2015/0069895 | A1* | 3/2015 | Tahara | 312/319.1 |
| 2015/0345181 | A1* | 12/2015 | Moore | 49/58 |

FOREIGN PATENT DOCUMENTS

| | | | |
|---|---|---|---|
| EP | 2908181 | A1 * | 8/2015 |
| JP | 2018065258 | | 4/2018 |

* cited by examiner

*Primary Examiner* — Sophia S Chen
(74) *Attorney, Agent, or Firm* — JCIPRNET

(57) ABSTRACT

A latch mechanism includes an operation unit, a connection unit extending in one direction and having one end connected to the operation unit, a restriction unit restricting the connection unit such that the other end of the connection unit moves to one side in the one direction, in a case where the operation unit is moved to one side in an intersecting direction intersecting with the one direction, a moving unit connected to the other end of the connection unit, extending in the one direction, and moving from a first position to a second position as the other end of the connection unit moves, and a meshing unit meshing with the moving unit arranged at the first position, and releasing meshing with the moving unit arranged at the second position.

20 Claims, 9 Drawing Sheets

LATCH MECHANISM, LATCH DEVICE, AND IMAGE FORMING APPARATUS

CROSS-REFERENCE TO RELATED APPLICATIONS

This application is based on and claims priority under 35 USC 119 from Japanese Patent Application No. 2021-188946 filed Nov. 19, 2021.

BACKGROUND

(i) Technical Field

The present invention relates to a latch mechanism, a latch device, and an image forming apparatus.

(ii) Related Art

An opening/closing mechanism disclosed in JP2018-65258A includes an opening/closing door rotatably supported to be movable between a closing position for covering an opening of an apparatus body and an opening position for opening the opening, an engagement member that engages with an engagement target portion rotatably supported by the opening/closing door and provided in the apparatus body, a link member rotatably supported by a rotary shaft provided in the apparatus body, and a guide member having a first guide surface rotatably supported by a support shaft in the opening/closing door, supported to be movable in a direction intersecting with a rotation direction, and moving while coming into contact with the link member when the opening/closing door moves to the closing position, and a second guide surface moving while coming into contact with the link member when the opening/closing door moves to the opening position.

SUMMARY

A latch mechanism includes an operation unit rotating a link, a moving unit (latch) rotated by a rotational force transmitted via the link, and a meshing unit (latch receiver) releasing meshing with the moving unit by rotating the moving unit. In the related art, since the moving unit rotates in this way, a region for rotating the moving unit is required.

Aspects of non-limiting embodiments of the present disclosure relate to a latch mechanism, a latch device, and an image forming apparatus which release meshing between a moving unit and a meshing unit without rotating the moving unit in a configuration in which a moving force is transmitted to the moving unit by operating an operation unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a latch mechanism including an operation unit, a connection unit extending in one direction and having one end connected to the operation unit, a restriction unit restricting the connection unit such that the other end of the connection unit moves to one side in the one direction, in a case where the operation unit is moved to one side in an intersecting direction intersecting with the one direction, a moving unit connected to the other end of the connection unit, extending in the one direction, and moving from a first position to a second position as the other end of the connection unit moves, and a meshing unit meshing with the moving unit arranged at the first position, and releasing meshing with the moving unit arranged at the second position.

BRIEF DESCRIPTION OF THE DRAWINGS

Exemplary embodiment(s) of the present invention will be described in detail based on the following figures, wherein.

DETAILED DESCRIPTION

Figure 1:
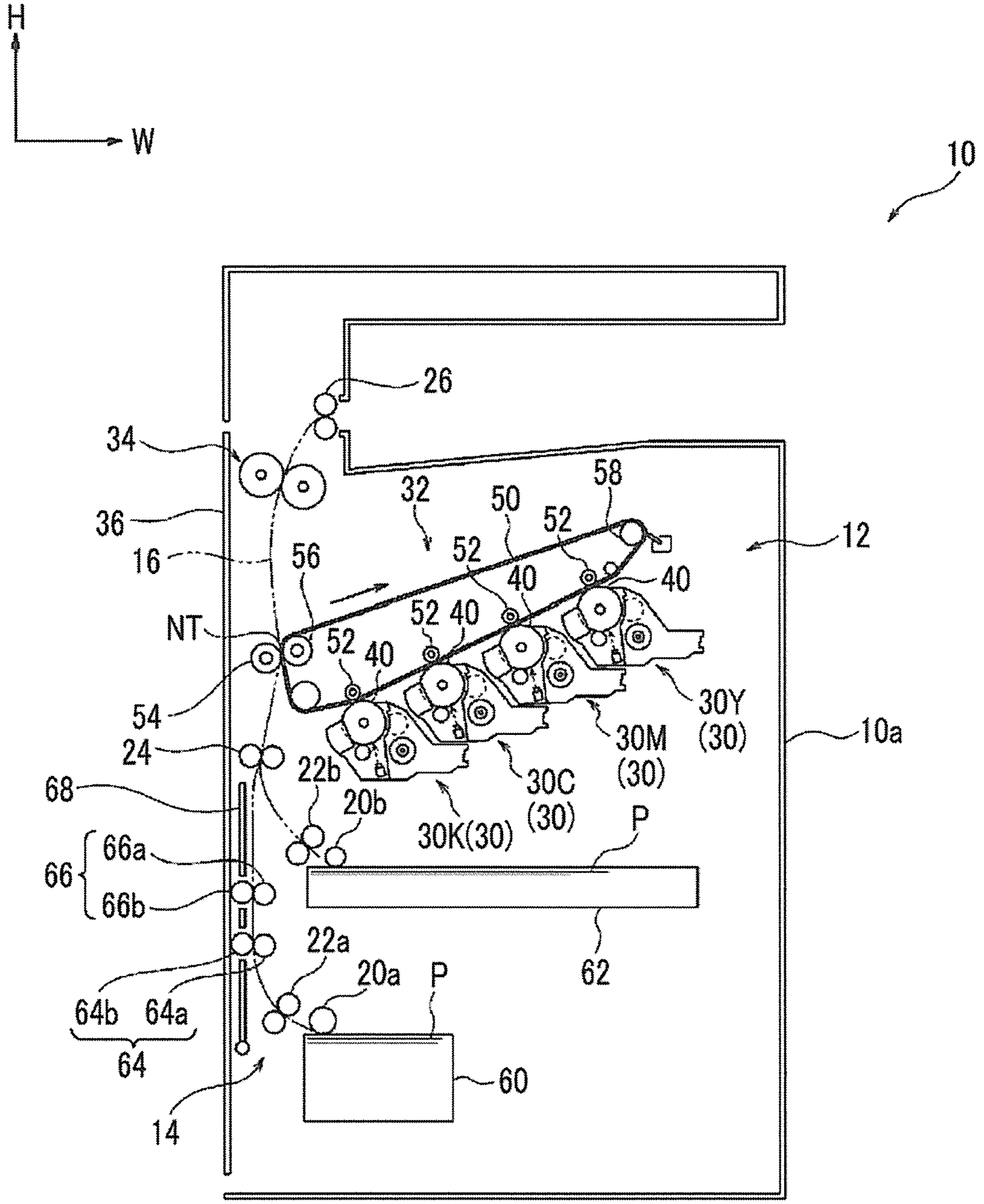
FIG. 1 is a schematic configuration diagram showing an image forming apparatus according to an exemplary embodiment of the present disclosure.

Examples of a latch mechanism, a latch device, and a image forming apparatus according to an exemplary embodiment of the present disclosure will be described with reference to FIGS. 1 to 9. An arrow H shown in the drawing indicates an apparatus up-down direction (vertical direction), an arrow W indicates an apparatus width direction (horizontal direction), and an arrow D indicates a apparatus depth direction (horizontal direction). In addition, the apparatus width direction and the apparatus depth direction are orthogonal to each other.

Overall Configuration of Image Forming Apparatus

As shown in FIG. 1, an image forming apparatus 10 includes an image forming unit 12 that forms a toner image by an electrophotographic method, accommodation units 60 and 62 that accommodate sheet members P, and a conveyance unit 14 that conveys the sheet members P accommodated in the accommodation units 60 and 62 along a conveyance path 16.

In the image forming apparatus 10 having the above-described configuration, the sheet members P accommodated in the accommodation units 60 and 62 are conveyed along the conveyance path 16 by the conveyance unit 14. Furthermore, the toner image formed by the image forming unit 12 is formed on the conveyed sheet member P, and the sheet member P on which the toner image is formed is discharged to an outside of an apparatus body 10*a*.

Image Forming Unit 12

As shown in FIG. 1, the image forming unit 12 includes a plurality of toner image forming units 30 that form the toner images of each color, and a transfer unit 32 that transfers the toner images formed by the toner image forming units 30 to the sheet members P. Furthermore, the image forming unit 12 includes a fixing device 34 that fixes the toner images transferred to the sheet members P by the transfer unit 32 to the sheet members P.

Toner Image Forming Unit 30

The plurality of toner image forming units 30 are provided to form the toner image for each color. In the present exemplary embodiment, the toner image forming units 30 are provided to have a total of four colors of yellow (Y), magenta (M), cyan (C), and black (K). In the following description, in a case where yellow (Y), magenta (M), cyan (C), and black (K) do not need to be distinguished from each other, Y, M, C, and K assigned to reference numerals will be omitted.

Figure 2:
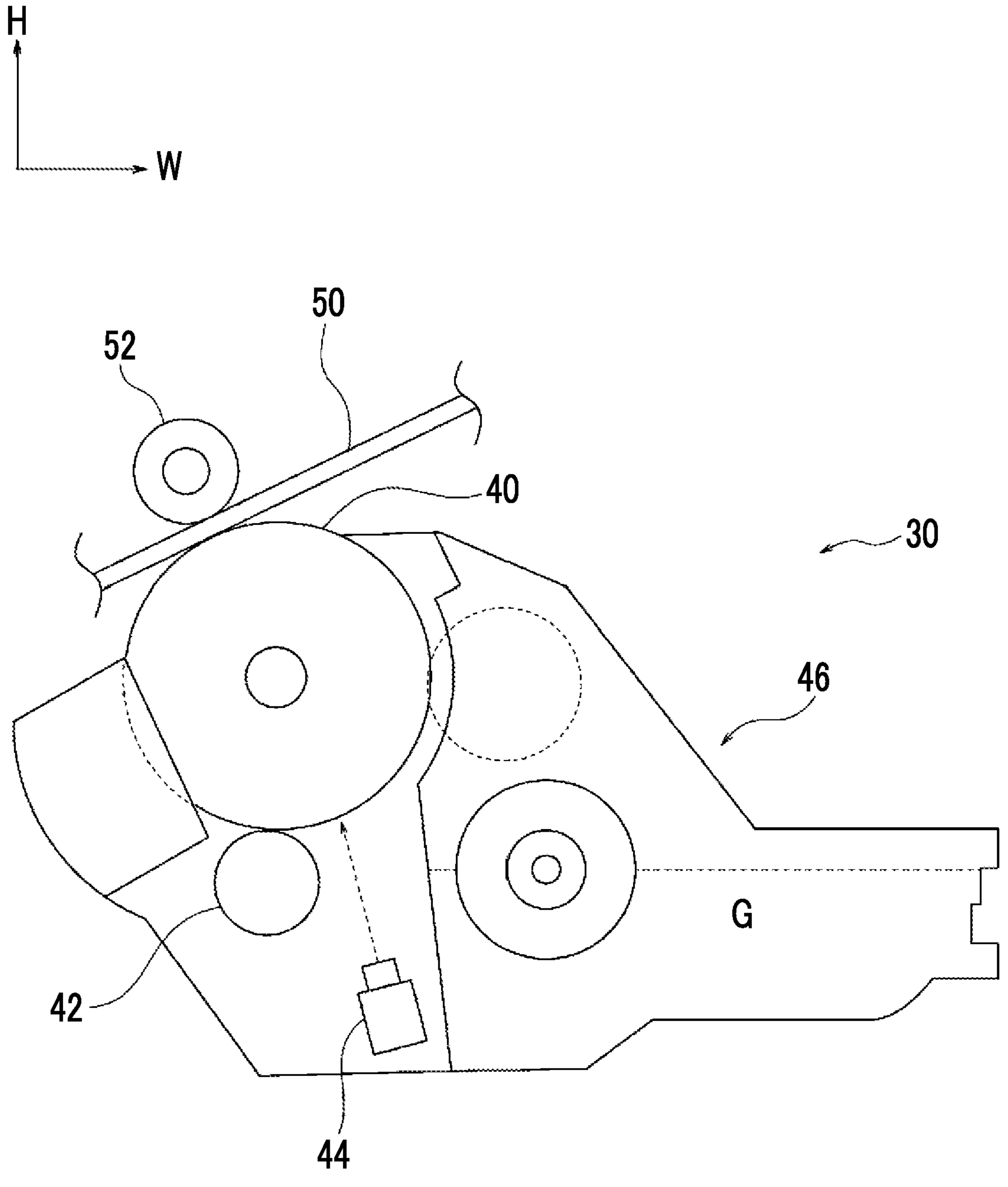
FIG. 2 is a configuration diagram showing a toner image forming unit provided in the image forming apparatus according to the exemplary embodiment of the present disclosure.

The toner image forming unit 30 of each color is configured in basically the same manner except for a toner to be used. As shown in FIG. 2, the toner image forming unit 30 includes an image holder 40 having a rotating cylindrical shape and a charger 42 that charges the image holder 40. Furthermore, the toner image forming unit 30 includes an exposure device 44 that irradiates the charged image holder 40 with exposure light to form an electrostatic latent image, and a developing device 46 that develops the electrostatic latent image as the toner image with a developer G containing the toner. In this manner, the toner image forming unit 30 of each color forms an image of each color by using the toner of each color.

In addition, as shown in FIG. 1, the image holder 40 of each color is in contact with a transfer belt 50 (details will be described later) that moves around the image holder 40. In a circumferential direction of the transfer belt 50 (refer to an arrow in the drawing), the toner image forming units 30 of yellow (Y), magenta (M), cyan (C), and black (K) are arranged in this order from an upstream side.

Transfer Unit 32

As shown in FIG. 1, the transfer unit 32 includes the transfer belt 50 and first transfer rolls 52 each arranged on a side opposite to the image holder 40 of each color across the transfer belt 50 and transferring the toner image formed on the image holder 40 of each color to the transfer belt 50.

In addition, the transfer unit 32 includes a winding roll 56 around which the transfer belt 50 is wound, and a drive roll 58 around which the transfer belt 50 is wound and transmitting a rotational force to the transfer belt 50. In this manner, the transfer belt 50 turns in an arrow direction in the drawing.

Furthermore, the transfer unit 32 includes a second transfer roll 54 arranged on a side opposite to the winding roll 56 across the transfer belt 50 and transferring the toner image transferred to the transfer belt 50 to the sheet member P. A transfer nip NT that transfers the toner image to the sheet member P is formed between the second transfer roll 54 and the transfer belt 50.

In this configuration, the toner images are first transferred to the transfer belt 50 by the first transfer roll 52 in the order of yellow (Y), magenta (M), cyan (C), and black (K). On the other hand, the toner images are transferred from the transfer belt 50 to the sheet members P pinched and conveyed between the transfer belt 50 and the second transfer roll 54 by the second transfer roll 54. Furthermore, the sheet members P to which the toner images are transferred are conveyed toward the fixing device 34.

Fixing Device 34

As shown in FIG. 1, the fixing device 34 is arranged on a downstream side of the transfer nip NT in a conveyance direction of the sheet members P (hereinafter, referred to as a "sheet conveyance direction"). The fixing device 34 heats and pressurizes the toner images transferred to the sheet members P, and fixes the toner images on the sheet members P.

Accommodation Units 60 and 62

As shown in FIG. 1, the accommodation units 60 and 62 are arranged in the apparatus up-down direction. The accommodation unit 60 is arranged below the accommodation unit 62. In the present exemplary embodiment, the accommodation unit 60 mostly accommodates the sheet member P having an A4 size, and the accommodation unit 62 mostly accommodates the sheet member P having an A3 size. In the image forming apparatus 10, the sheet members P having the A4 size are consumed most. Therefore, the number of sheets that can be accommodated in the accommodation unit 60 accommodating the sheet members P consumed most is larger than the number of sheets that can be accommodated in the accommodation unit 62. In other words, a thickness of the accommodation unit 60 in the apparatus up-down direction is thicker than a thickness of the accommodation unit 62 in the apparatus up-down direction.

Conveyance Unit 14

As shown in FIG. 1, the conveyance unit 14 conveys the sheet members P accommodated in the accommodation units 60 and 62 along the conveyance path 16.

Specifically, the conveyance unit 14 includes an adjustment roll 24 arranged on an upstream side of the transfer nip NT in the sheet conveyance direction, and adjusting a timing at which the sheet member P is delivered to the transfer nip NT. Furthermore, the conveyance unit 14 includes a discharge roll 26 arranged on the downstream side of the fixing device 34 in the sheet conveyance direction, and discharging the sheet member P on which the toner image is fixed to an outside of the apparatus body 10*a*.

In addition, the conveyance unit 14 includes a delivery roll 20*a* that delivers the sheet members P accommodated in the accommodation unit 60 to the conveyance path 16, and a prevention roll 22*a* that prevents the sheet members P delivered by the delivery roll 20*a* from being simultaneously delivered.

Furthermore, the conveyance unit 14 includes a delivery roll 20*b* that delivers the sheet members P accommodated in the accommodation unit 62 to the conveyance path 16, and a prevention roll 22*b* that prevents the sheet members P delivered by the delivery roll 20*b* from being simultaneously delivered.

In addition, the conveyance unit 14 includes a conveyance roll 64 arranged on the downstream side of the prevention roll 22*a* in the sheet conveyance direction, and a conveyance roll 66 arranged on the downstream side of the conveyance roll 64 in the sheet conveyance direction. The conveyance roll 64 and the conveyance roll 66 are arranged in the apparatus up-down direction.

Furthermore, the conveyance roll 64 includes a driving roll portion 64*a* and a driven roll portion 64*b*, and the driving roll portion 64*a* and the driven roll portion 64*b* are arranged in the apparatus width direction. In the apparatus width direction, a roll on the accommodation unit 60 side is the driving roll portion 64*a*.

In addition, the conveyance roll 66 includes a driving roll portion 66*a* and a driven roll portion 66*b*, and the driving roll portion 66*a* and the driven roll portion 66*b* are arranged in the apparatus width direction. In the apparatus width direction, a roll on the accommodation unit 60 side is the driving roll portion 66*a*.

Others

Figure 4:
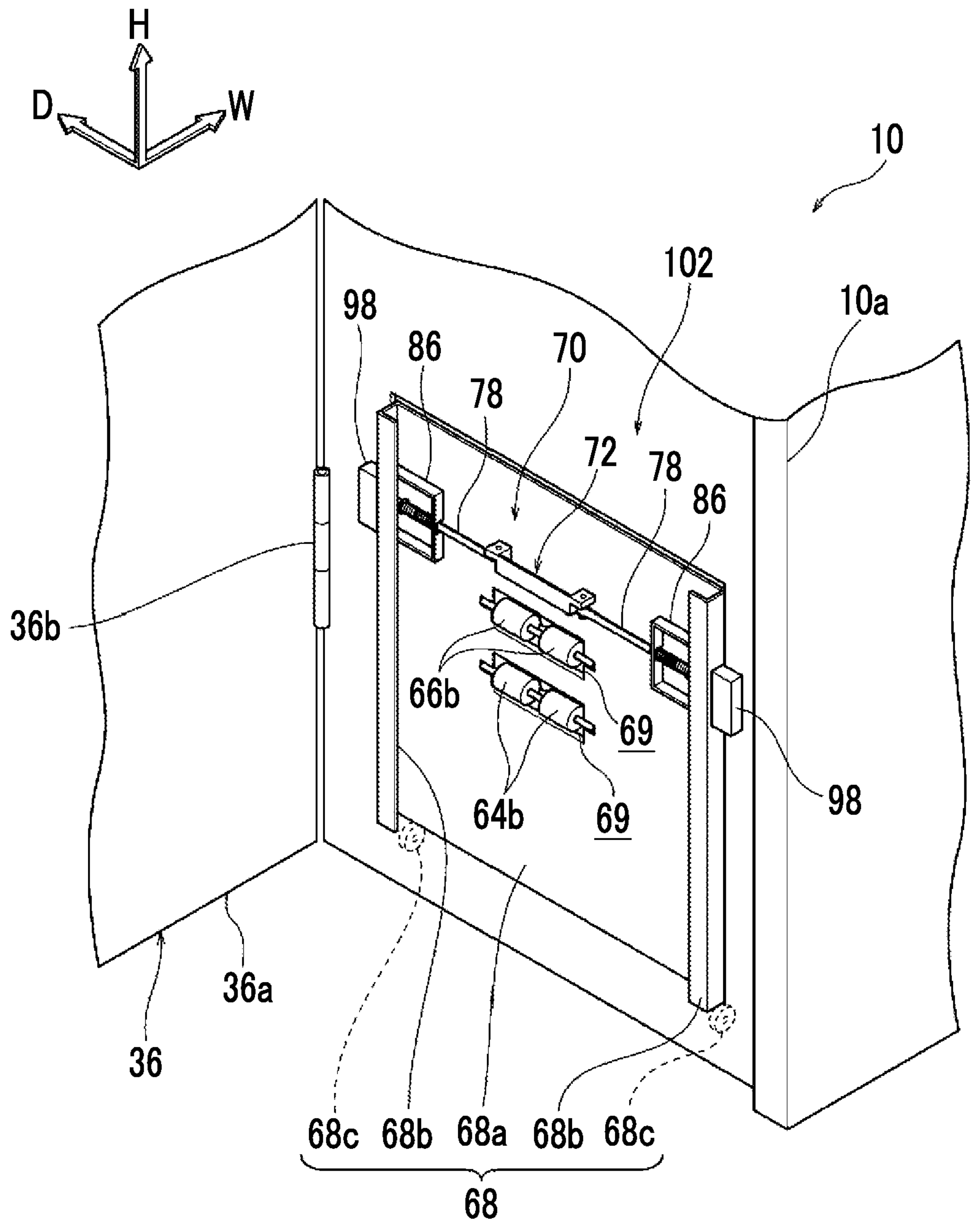
FIG. 4 is a perspective view showing an inner cover arranged at a closing position provided in the image forming apparatus according to the exemplary embodiment of the present disclosure.

The image forming apparatus 10 includes an exterior cover 36 that opens a side surface of the apparatus body 10*a*, and an inner cover 68 that opens the conveyance path 16 of a portion conveyed by the conveyance rolls 64 and 66. Furthermore, as shown in FIG. 4, the image forming apparatus 10 includes a latch mechanism 70 attached to the inner cover 68.

Figure 3A:
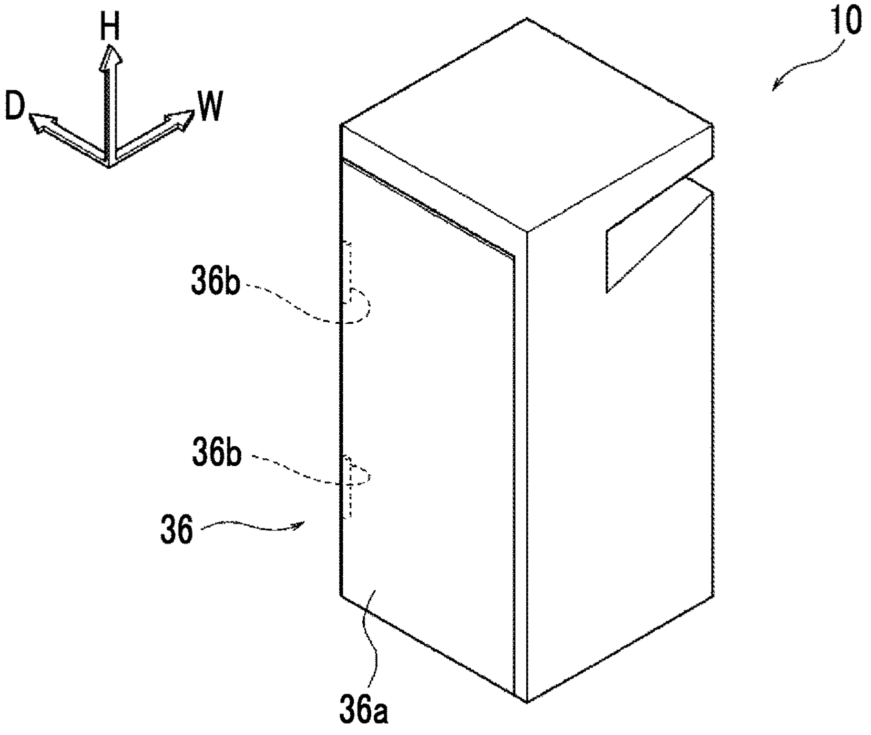
FIGS. 3A and 3B are perspective views showing the image forming apparatus according to the exemplary embodiment of the present disclosure, and showing a closed state and an open state of an exterior cover.
Figure 3B:
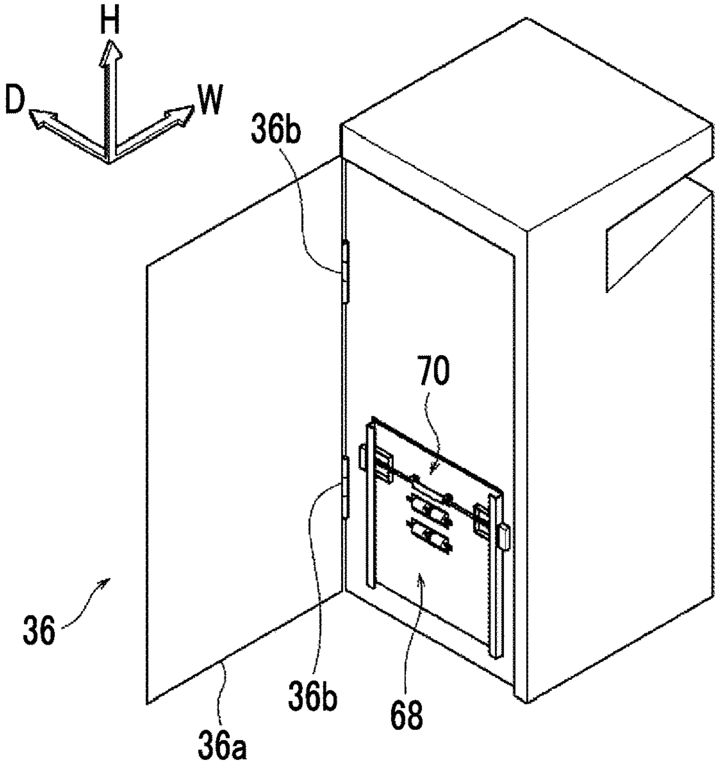

As shown in FIGS. 3A and 3B, the exterior cover 36 includes a rectangular cover body 36*a* extending in the apparatus up-down direction, and two hinges 36*b* attached to the cover body 36*a*. The two hinges 36*b* are arranged in the apparatus up-down direction on an inner side in the apparatus depth direction. As shown in FIG. 3B, in a case where the exterior cover 36 is opened, the inner cover 68 can be visually recognized from the outside.

Details of the inner cover 68 and the latch mechanism 70 will be described later.

Major Configuration

Next, the inner cover 68 and the latch mechanism 70 will be described.

Inner Cover 68

As shown in FIG. 4, the inner cover 68 is arranged in a lower portion of the apparatus body 10*a*. The inner cover 68 includes a rectangular plate-shaped main body part 68*a* extending in the apparatus up-down direction in a case where the inner cover 68 is viewed in the apparatus width direction, a flange portion 68*b* attached to both end portions of the main body part 68*a* in the apparatus depth direction and having an L-shaped cross-sectional shape, and a shaft portion 68*c* provided in a lower portion of the main body part 68*a*. The apparatus body 10*a* is an example of a main body, and the inner cover 68 is an example of an operation target and an opening unit.

In addition, in a central portion of the main body part 68*a* in the apparatus depth direction and in a portion above a central portion in the apparatus up-down direction, two rectangular through-holes 69 extending in the apparatus depth direction are arranged in the apparatus up-down direction.

The driven roll portion 64*b* is arranged in the lower through-hole 69, and is rotatably supported by the main body part 68*a*. In addition, the driven roll portion 66*b* is arranged in the upper through-hole 69, and is rotatably supported by the main body part 68*a*. A portion of the driven roll portions 64*b* and 66*b* is exposed to the conveyance path 16 (refer to FIG. 1) side through the through-hole 69. In addition, an axial direction of the shaft portion 68*c* is the apparatus depth direction.

In this configuration, the inner cover 68 moves between an opening position (refer to FIG. 5) for opening a portion of the conveyance path 16 to the outside and a closing position (refer to FIG. 4) for closing a portion of the conveyance path 16, while the shaft portion 68*c* serves as a rotation center. The inner cover 68 is stopped at the opening position or the closing position by a stopper (not shown).

Latch Mechanism 70

Figure 6A:
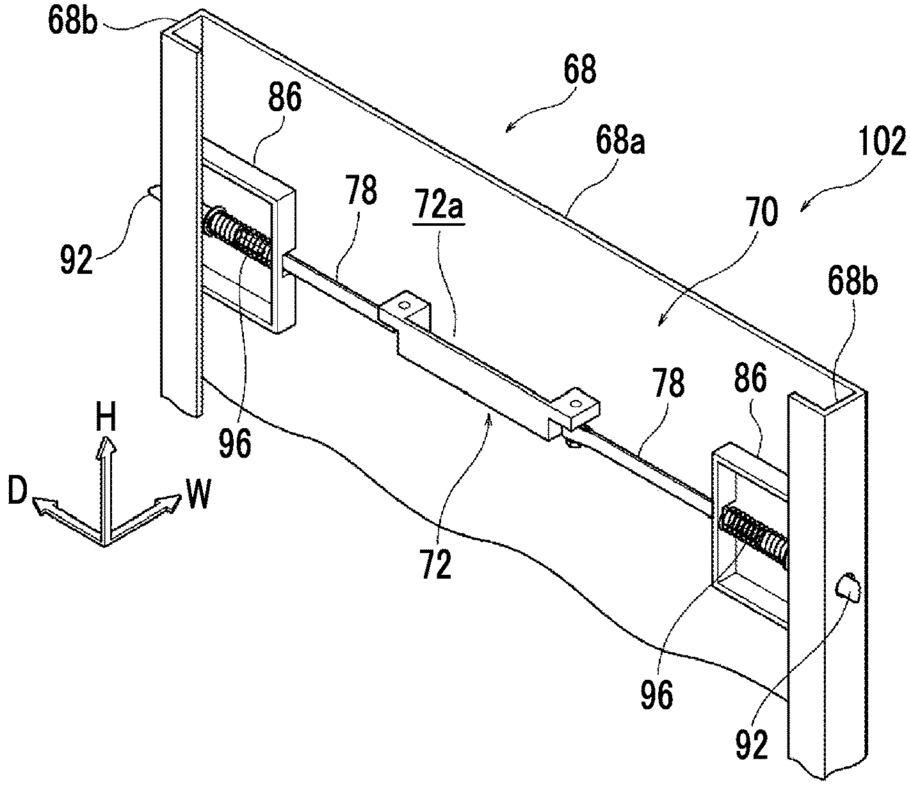
FIGS. 6A and 6B are perspective views showing an operation of a latch mechanism according to the exemplary embodiment of the present disclosure.

As shown in FIG. 4, the latch mechanism 70 is arranged above the driven roll portion 66*b*. As shown in FIG. 6A, the latch mechanism 70 includes an operation unit 72 operated by an operator, a connection unit 78 having one end connected to the operation unit 72, and a restriction unit 86 that restricts movement of the connection unit 78. Furthermore, the latch mechanism 70 includes a moving unit 92 that moves as the connection unit 78 moves, a coil spring 96 that biases the moving unit 92, and a meshing unit 98 (refer to FIGS. 8A and 8B) that meshes with or releases meshing with the moving unit 92 which moves.

Operation Unit 72

Figure 7A:
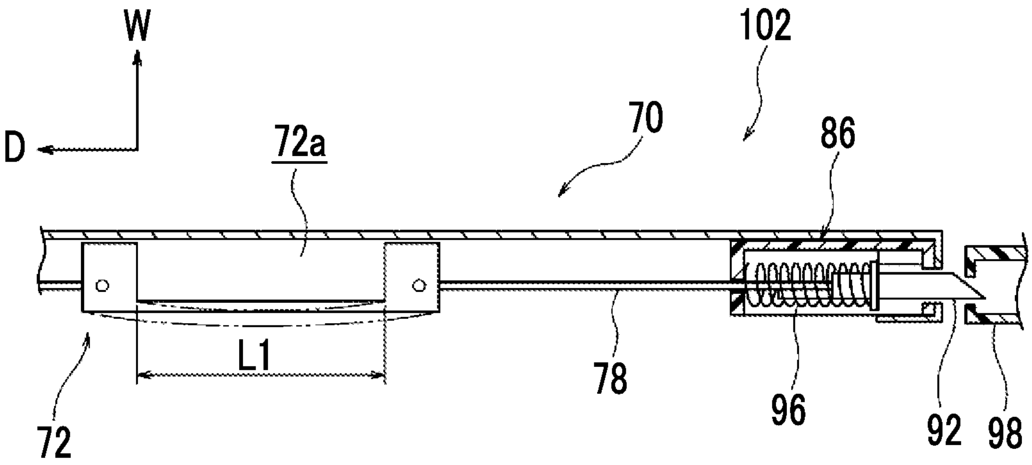
FIGS. 7A and 7B are plan views showing an operation of the latch mechanism according to the exemplary embodiment of the present disclosure.

The operation unit 72 is integrally formed of a resin material. In the present exemplary embodiment, the operation unit 72 is integrally formed by using polyacetal (POM). As shown in FIGS. 6A and 7A, the operation unit 72 is arranged in the central portion of the main body part 68*a* in the apparatus depth direction, on a side opposite to the conveyance path 16 (refer to FIG. 1).

In addition, the operation unit 72 has a U-shape in which the main body part 68*a* is open in a case where the operation unit 72 is viewed in the apparatus up-down direction, and extends in the apparatus depth direction. In a state where no operation force is applied to the operation unit 72 (hereinafter, simply referred to as a "non-load state" in some cases), an insertion space 72*a* into which a fingertip of an operator is insertable is formed between the operation unit 72 and the main body part 68*a*. The insertion space 72*a* is open in the apparatus up-down direction. In other words, the insertion space 72*a* is open in a direction in which the fingertip of the operator approaches.

Furthermore, fingertips of the four fingers of the operator are insertable into the insertion space 72*a*. Here, in the present exemplary embodiment, the insertion space 72*a* into which the fingertips of the four fingers of the operator are insertable is a space in which a dimension (L1 in FIG. 7A) of the insertion space 72*a* in the apparatus depth direction is 75 mm or larger. In addition, although there is no particular limitation, for example, a range as the dimension L1 in the apparatus width direction of the insertion space 72*a* into which the four fingertips of the operator are insertable is preferably 75 mm or larger, more preferably 80 mm or larger, and still more preferably 85 mm or larger. In addition, as will be described in detail later, for example, the dimension L1 in the apparatus depth direction of the insertion space 72*a* is preferably 95 mm or smaller. In the present exemplary embodiment, the dimension L1 of the insertion space 72*a* in the apparatus depth direction is 85 mm.

Figure 9A:
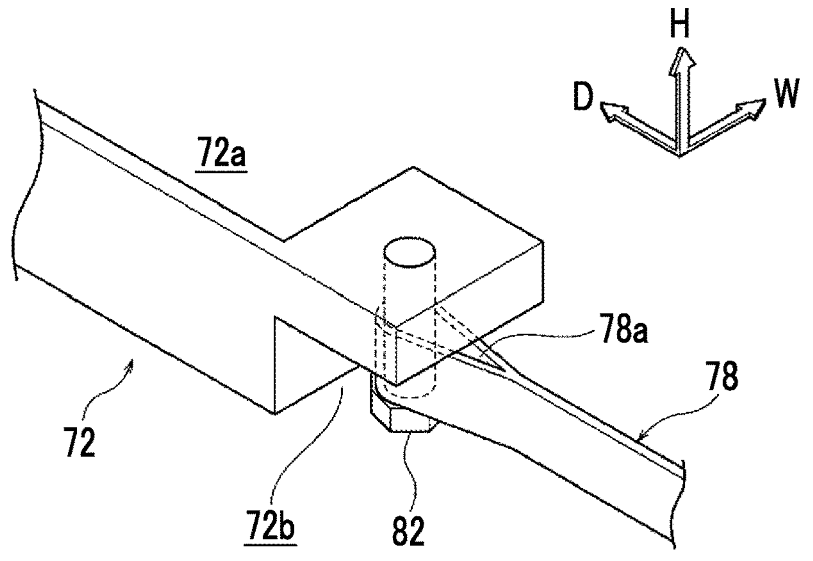
FIGS. 9A and 9B are enlarged perspective views showing an operation unit and a restriction unit of the latch mechanism according to the exemplary embodiment of the present disclosure.

Furthermore, as shown in FIG. 9A, a recessed portion 72*b* whose lower surface is recessed is formed in a lower end of both end portions of the operation unit 72 in the apparatus depth direction, and one end of the connection unit 78 is arranged in the recessed portion 72*b*. FIG. 9A shows only one end portion of the operation unit 72.

Connection Unit 78

The connection unit 78 and the moving unit 92 are integrally formed of a resin material. In the present exemplary embodiment, the connection unit 78 and the moving unit 92 are integrally formed by using polyacetal (POM). The connection units 78 are provided in pairs, and as shown in FIG. 6A, the operation units 72 are respectively arranged across the connection unit 78. Since the pair of connection units 78 has a symmetrical configuration in the apparatus depth direction, one of the connection units 78 will be mostly described below.

In the no-load state, the connection unit 78 extends in the apparatus depth direction, and a cross section of the connection unit 78 has a rectangular shape extending in the apparatus up-down direction. In other words, the connection unit 78 has a flat plate shape. In addition, the apparatus depth direction is an example of one direction.

In addition, one end of the connection unit 78 is connected to an end portion of the operation unit 72 in the apparatus depth direction. Specifically, as shown in FIG. 9A, an annular portion 78*a* penetrating in the apparatus up-down direction is formed in one end portion of the connection unit 78. A screw 82 passes through the annular portion 78*a* from below, and is fastened to a screw hole (not shown) of the operation unit 72 so that one end of the connection unit 78 is rotatably connected to the end portion of the operation unit 72.

Figure 9B:
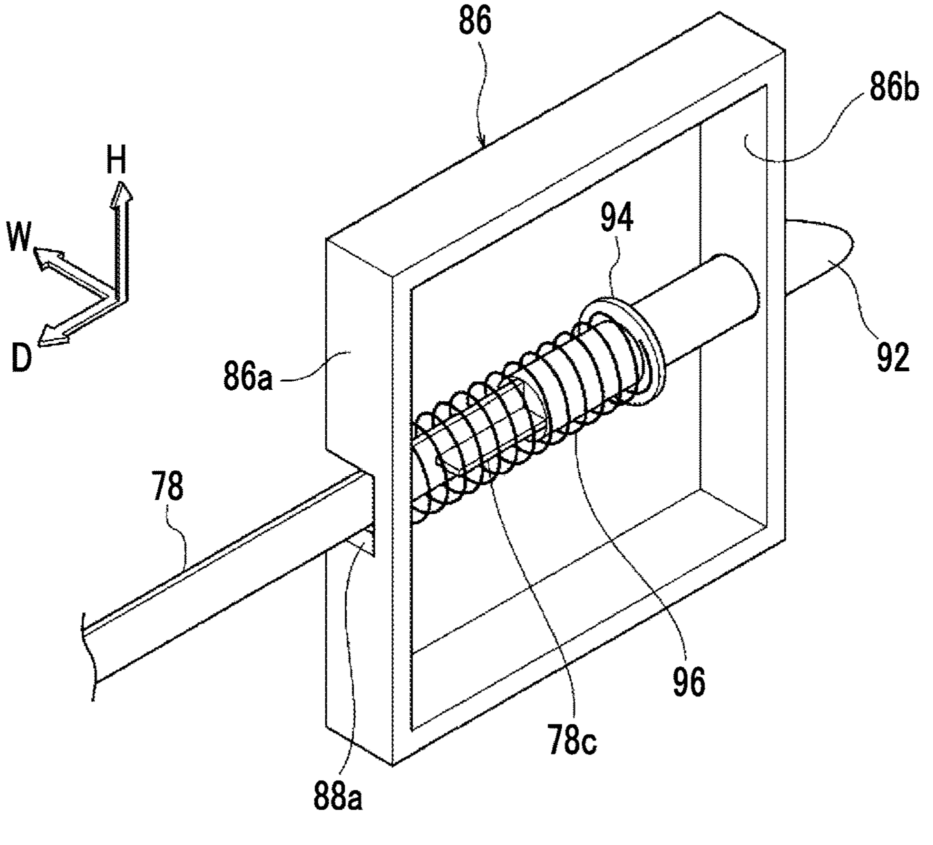

On the other hand, as shown in FIG. 9B, a rib 78*c* protruding in a plate thickness direction of the connection unit 78 is formed in the other end portion of the connection unit 78. Furthermore, the moving unit 92 is connected to the other end of the connection unit 78.

Restriction Unit 86

The restriction unit 86 is integrally formed of a resin material. In the present exemplary embodiment, the restriction unit 86 is integrally formed by using acrylonitrile butadiene styrene (ABS). The restriction units 86 are provided in pairs, and as shown in FIG. 6A, the restriction units 86 are arranged in both end portions of the main body part 68*a* in the apparatus depth direction. Since the pair of restriction units 86 has a symmetrical configuration in the apparatus depth direction, one of the restriction units 86 will be mostly described below.

The restriction unit 86 is attached to the main body part 68*a* by using an attachment member (not shown). The restriction unit 86 has a rectangular shape in a case where the restriction unit 86 is viewed in the apparatus width direction, and has a recessed shape whose one side is open in the apparatus width direction. Furthermore, a portion of the restriction unit 86 is arranged inside the flange portion 68*b*.

Figure 8A:
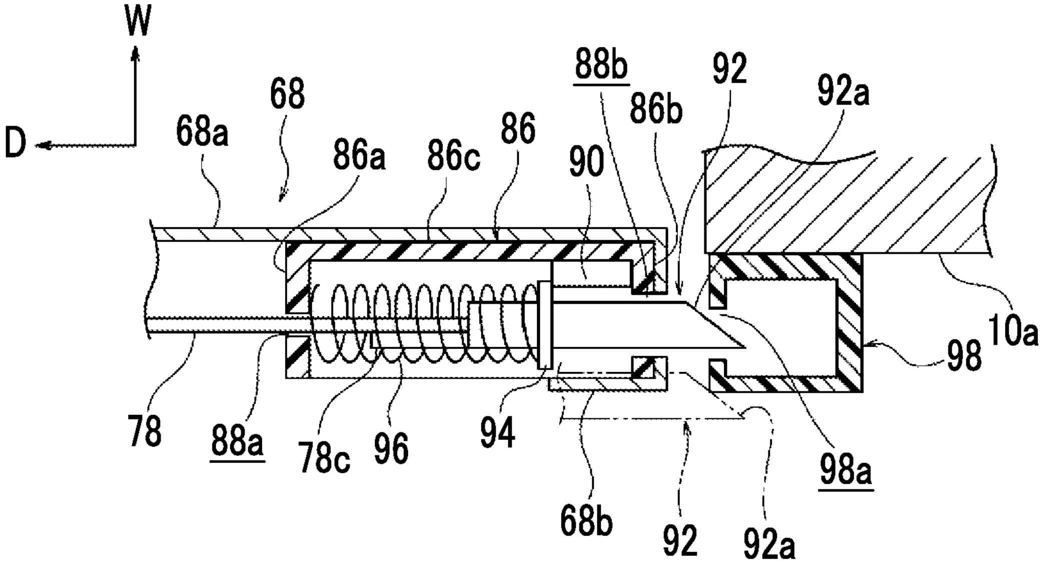
FIGS. 8A and 8B are enlarged sectional views showing an operation of the latch mechanism according to the exemplary embodiment of the present disclosure.

In addition, as shown in FIG. 8A, a through-hole 88*a* into which the other end portion of the connection unit 78 is inserted is formed in a side plate 86*a* facing the operation unit 72 side in the restriction unit 86. In this manner, the restriction unit 86 restricts the movement of the other end of the connection unit 78 in the apparatus depth direction.

In addition, a through-hole 88*b* into which the moving unit 92 is inserted is formed in a side plate 86*b* facing the side opposite to the operation unit 72 side in the restriction unit 86. A through-hole (reference numeral omitted) into which the moving unit 92 is inserted is also formed in the flange portion 68*b* that overlaps the side plate 86*b* of the moving unit 92. Furthermore, a rib 90 protruding into the restriction unit 86 is formed in a portion on the side plate 86*b* side in a bottom plate 86*c* of the restriction unit 86.

In addition, the rib 78*c* formed in the other end portion of the connection unit 78 is arranged inside the restriction unit 86. In the no-load state, the rib 78*c* and the side plate 86*a* of the restriction unit 86 are separated from each other in the apparatus depth direction.

Moving Unit 92 and Coil Spring 96

As described above, the moving unit 92 and the connection unit 78 are integrally formed of a resin material.

As shown in FIG. 6A, the moving units 92 are provided in pairs. Since the pair of moving units 92 has a symmetrical configuration in the apparatus depth direction, one of the moving units 92 will be mostly described below.

In a state where the inner cover 68 is arranged at the closing position, the moving unit 92 is arranged on the inner cover 68 side with respect to the conveyance path 16 in a case where the moving unit 92 is viewed in the apparatus depth direction. Furthermore, as shown in FIG. 9B, the moving unit 92 has a columnar shape extending in the apparatus depth direction. As shown in FIG. 8A, a tapered surface 92*a* facing the conveyance path 16 side (refer to FIG. 1) in the apparatus width direction is formed in a tip of the moving unit 92.

In addition, an E-ring 94 is attached to an outer peripheral surface of the moving unit 92. A coil spring 96 is arranged between the E-ring 94 and the side plate 86*a*. The coil spring 96 is an example of a biasing unit.

The coil spring 96 (hereinafter, referred to as a "spring 96") is a compression coil spring, and a portion of the moving unit 92 and the other end portion of the connection unit 78 are arranged inside the spring 96.

In addition, in the no-load state, the connection unit 78, the restriction unit 86, the moving unit 92, and the coil spring 96 are arranged in a region where the operation unit 72 is arranged in the apparatus width direction.

In this configuration, the spring 96 biases the moving unit 92 to the other side in the apparatus depth direction. The E-ring 94 comes into contact with the rib 90 to restrict the movement of the moving unit 92. In this state, the moving unit 92 is arranged at the first position (refer to FIG. 8A).

Figure 7B:
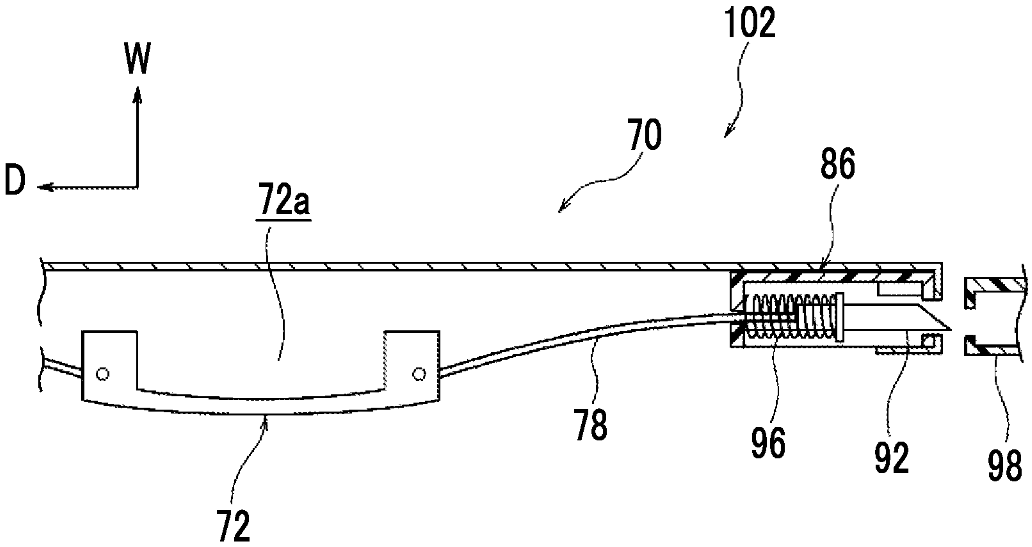

Furthermore, in a case where the operator inserts the fingertip into the insertion space 72*a* of the operation unit 72, the operation unit 72 is elastically deformed (refer to a two-dot chain line in FIG. 7A). In this manner, a pad of the fingertip of the operator is insertable into the insertion space 72*a*. Furthermore, in a case where the operator applies an operation force to the operation unit 72 and moves the operation unit 72 to one side in the apparatus width direction, as shown in FIGS. 7A and 7B, the operation unit 72 is elastically deformed to spread the insertion space 72*a*. In addition, one end of the connection unit 78 connected to the operation unit 72 moves to one side in the apparatus width direction.

The connection unit 78 whose one end moves to one side in the apparatus width direction is elastically deformed in a curved shape in a case where the connection unit 78 is viewed from above, since a moving direction of the other end of the connection unit 78 is restricted by the restriction unit 86. The other end of the connection unit 78 moves to one side in the apparatus depth direction.

In this way, since the connection unit 78 is elastically deformed, the moving direction of an end portion of the connection unit 78 is changed. Therefore, the length of the connection unit 78 in the apparatus depth direction is required. In the present exemplary embodiment, the length of the connection unit 78 requires 70 mm. In addition, the length from the other end of one of the connection units 78 to the other end of the other of the connection units 78 is 235 mm. In this case, although there is no particular limitation, for example, a range of the length of the insertion space 72*a* of the operation unit 72 in the apparatus depth direction is preferably 95 mm or smaller.

Figure 8B:
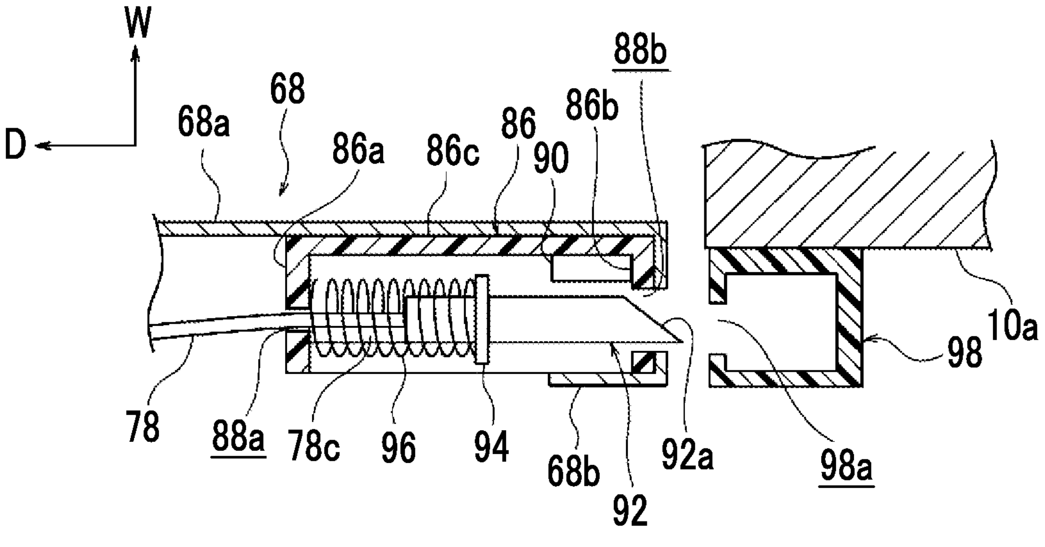

The other end of the connection unit 78 is moved to one side in the apparatus depth direction. In this manner, the rib 78*c* formed in the other end of the connection unit 78 and the moving unit 92 connected to the other end of the connection unit 78 also move to one side in the apparatus depth direction. Since the rib 78*c* formed in the connection unit 78 and the moving unit 92 move, as shown in FIG. 8B, the rib 78*c* comes into contact with the side plate 86*a* of the restriction unit 86 to restrict the movement of the connection unit 78 and the moving unit 92. In this state, the moving unit 92 is arranged at the second position.

The apparatus width direction is an example of an intersecting direction, and one side in the apparatus depth direction is a side closer to the operation unit 72. In addition, elastic deformation is deformation caused by applying a force to an object, and specifically indicates deformation returning to an original shape in a case where the force is removed.

Meshing Unit 98

As shown in FIG. 4, the meshing units 98 are provided in pairs, and are respectively arranged to pinch the inner cover 68 in the apparatus depth direction. The meshing unit 98 is attached to the apparatus body 10*a* by an attachment tool (not shown). Since the pair of meshing units 98 has a symmetrical configuration in the apparatus depth direction, one of the meshing units 98 will be mostly described below.

As shown in FIG. 8A, the meshing unit 98 has an internally hollow structure, and a through-hole 98*a* into which the tip of the moving unit 92 arranged at the first position is inserted is formed.

In this configuration, the tip of the moving unit 92 arranged at the first position is inserted into the through-hole 98*a* of the meshing unit 98. In this manner, the moving unit 92 meshes with the meshing unit 98. On the other hand, the tip of the moving unit 92 arranged at the second position is pulled out from the through-hole 98*a* of the meshing unit 98. In this manner, meshing between the moving unit 92 and the meshing unit 98 is released.

In addition, the apparatus body 10*a*, the inner cover 68, and the latch mechanism 70 which are described above configure a latch device 102 that holds the inner cover 68 in the apparatus body 10*a* or releases a holding state.

Operational Effect

Next, an operational effect of a main configuration will be described.

In a state where the inner cover 68 is arranged at the closing position, as shown in FIG. 4, the inner cover 68 closes the conveyance path 16. In this state, the sheet member P is conveyed along the conveyance path 16 shown in FIG. 1.

Furthermore, in a state where the inner cover 68 is arranged at the closing position and in the non-load state, as shown in FIG. 8A, the moving unit 92 is arranged at the first position. The tip of the moving unit 92 is inserted into the through-hole 98*a* of the meshing unit 98. In this manner, the moving unit 92 meshes with the meshing unit 98.

Furthermore, in a state where the inner cover 68 is arranged at the closing position and in the non-load state, as shown in FIGS. 6A and 7A, both end portions of the operation unit 72 in the apparatus depth direction are in contact with the main body part 68*a* of the inner cover 68. The insertion space 72*a* into which the fingertip of the operator is insertable is formed between the operation unit 72 and the main body part 68*a*.

In this state, for example, in a case where the sheet members P conveyed along the conveyance path 16 (refer to FIG. 1) are jammed in the conveyance path 16, the operator opens the exterior cover 36, and further opens the inner cover 68.

Specifically, in a state where the inner cover 68 is arranged at the closing position, the operator inserts the fingertip into the insertion space 72*a* of the operation unit 72 from above. In this manner, the operation unit 72 is elastically deformed (two-dot chain line in FIG. 7A), and bellies of the four fingertips of the operator are insertable into the insertion space 72*a*.

Figure 6B:
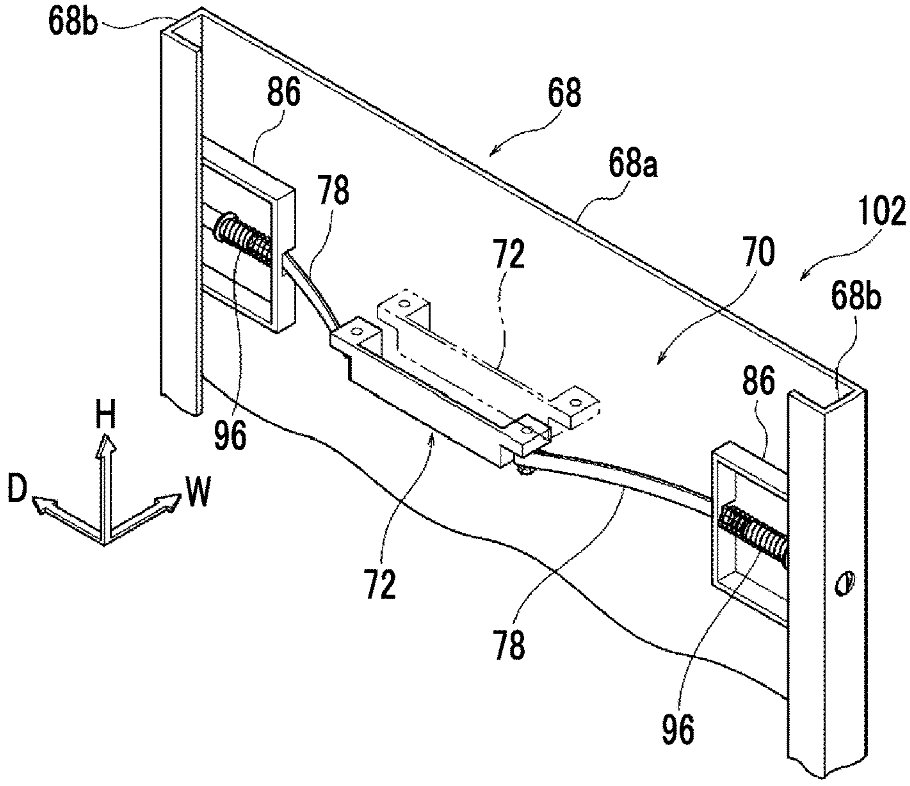

In addition, in a case where the operator moves the operation unit 72 to one side in the apparatus width direction in a state where the bellies of the four fingertips are inserted into the insertion space 72*a*, as shown in FIGS. 6B and 7B, one end of the connection unit 78 moves to one side in the apparatus width direction. Specifically, one end of the connection unit 78 moves to one side in the apparatus width direction while rotating around the screw 82 (refer to FIG. 9A).

Furthermore, the connection unit 78 whose one end moves to one side in the apparatus width direction is elastically deformed in a curved shape in a case where the connection unit 78 is viewed from above, since the moving direction of the other end of the connection unit 78 is restricted by the restriction unit 86. The other end of the connection unit 78 moves to one side in the apparatus depth direction.

In addition, as the other end of the connection unit 78 moves, the moving unit 92 also moves. As shown in FIG. 8B, the rib 78*c* comes into contact with the side plate 86*a* to restrict the movement of the moving unit 92 and the connection unit 78.

In this state, the moving unit 92 is arranged at the second position. The tip of the moving unit 92 is pulled out from the through-hole 98*a* of the meshing unit 98. In this manner, meshing between the moving unit 92 and the meshing unit 98 is released.

Figure 5:
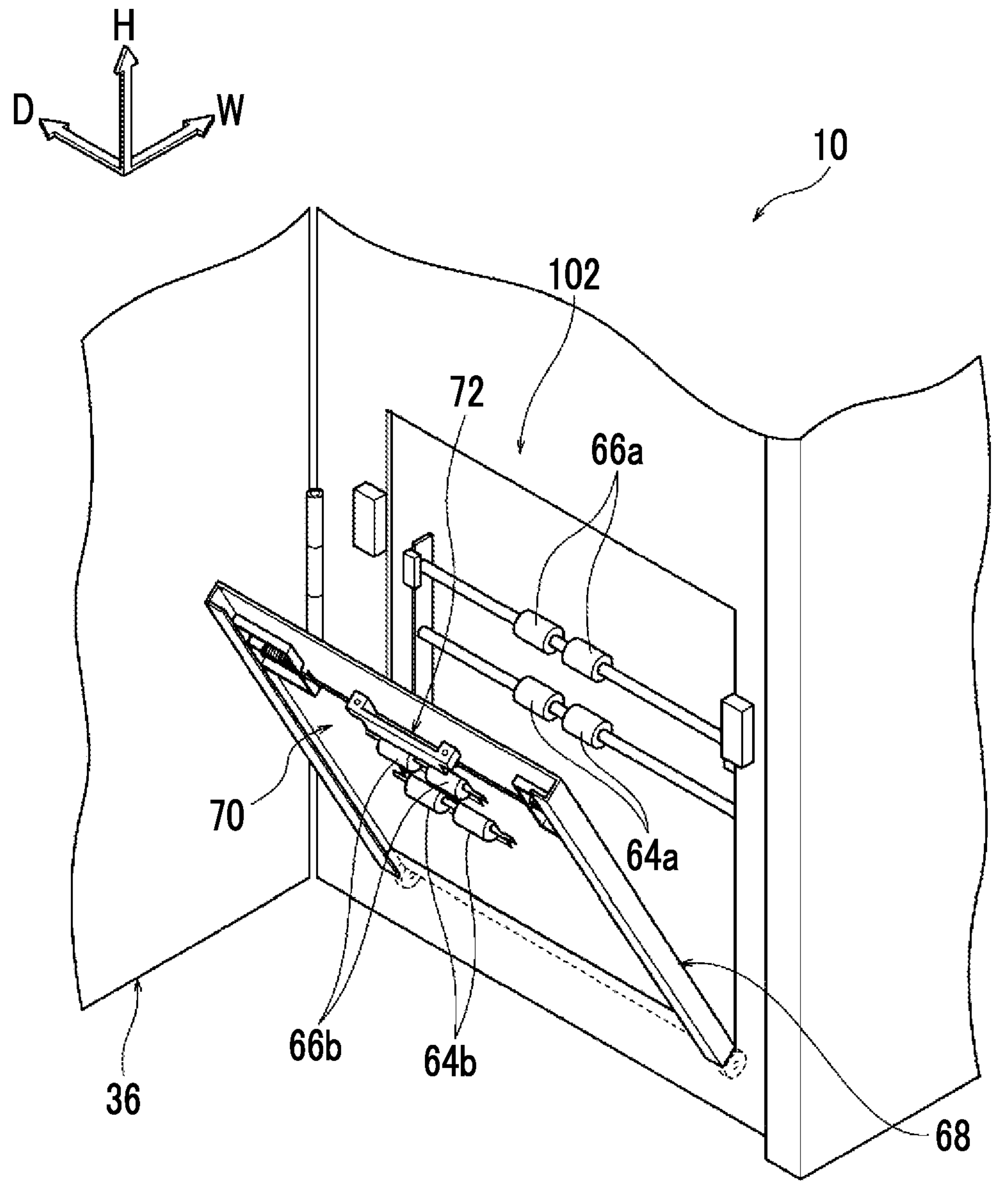
FIG. 5 is a perspective view showing the inner cover arranged at an opening position provided in the image forming apparatus according to the exemplary embodiment of the present disclosure.

Furthermore, in a case where the operator moves the operation unit 72 to one side in the apparatus width direction, as shown in FIG. 5, the inner cover 68 rotationally moves, and is stopped at the opening position by a stopper (not shown). In this manner, the conveyance path 16 (refer to FIG. 1) is opened. The operator removes the sheet member P jammed in the conveyance path 16. In this state, the operator releases the operation force applied to the operation unit 72 so that the moving unit 92 returns to the first position due to a biasing force of the spring 96 as shown in FIG. 8A.

In a case where the sheet member P jammed in the conveyance path 16 is removed, the operator presses any portion of the inner cover 68 arranged at the opening position, and rotates the inner cover 68 to move to the closing position.

Specifically, in a case where the inner cover 68 needs to move to the closing position, as shown by a two-dot chain line in FIG. 8A, the tapered surface 92*a* of the moving unit 92 comes into contact with the meshing unit 98, and the moving unit 92 moves to the other side in the apparatus width direction while moving to one side in the apparatus depth direction along the tapered surface 92*a*. The moving unit 92 reaches the through-hole 98*a* of the meshing unit 98, and returns to the first position due to the biasing force of the spring 96. In this manner, the moving unit 92 meshes with the meshing unit 98 so that the conveyance path 16 is closed and the sheet member P can be conveyed along the conveyance path 16.

SUMMARY

As described above, in the latch mechanism 70, in a case where the operation unit 72 is operated, the moving unit 92 moves in the apparatus depth direction so that meshing between the moving unit 92 and the meshing unit 98 is released. In this way, in a configuration in which the moving force is transmitted to the moving unit 92 by operating the operation unit 72, the meshing between the moving unit 92 and the meshing unit 98 is released without rotating the moving unit 92.

In addition, in the latch mechanism 70, the latch mechanism 70 includes the spring 96 that biases the moving unit 92 to the first position. In this manner, in the no-load state, the meshing between the moving unit 92 and the meshing unit 98 is maintained.

In addition, in the latch mechanism 70, one operation unit 72 is arranged among the pair of connection units 78, the restriction unit 86, the moving unit 92, and the meshing unit 98. In this manner, the pair of connection units 78 and the moving unit 92 are moved by one operation unit 72.

In addition, in the latch mechanism 70, the operation unit 72 extends in the apparatus depth direction. One of the connection units 78 is connected to one end of the operation unit 72 in the apparatus depth direction, and the other of the connection units 78 is connected to the other end of the operation unit. 72 in the apparatus depth direction. In this manner, the operation unit 72 is moved so that one of the connection units 78 and the other of the connection units 78 equally move.

In addition, in the latch mechanism 70, the connection unit 78 is elastically deformed in a case where the operation unit 72 is moved to one side in the apparatus width direction. Since the connection unit 78 is elastically deformed, the other end of the connection unit 78 whose one end moves in the apparatus width direction moves in the apparatus depth direction. In this way, since the connection unit 78 is elastically deformed, the moving direction can be changed. Therefore, compared to a case of using a link mechanism, the moving direction of one end of the connection unit 78 and the moving direction of the other end of the connection unit 78 can be changed with a simpler configuration.

In addition, in the latch mechanism 70, the operation unit 72 is elastically deformed in a case where an operation force is applied to the operation unit 72 to move the operation unit 72 to one side in the apparatus width direction. In this manner, compared to a case where the operation unit is a rigid body, the insertion space 72*a* is widened due to the elastic deformation. Therefore, operability is improved. In a state where the operation force is not applied to the operation unit 72, only the fingertip is inserted into the insertion space 72*a*. Therefore, a protruding amount of the operation unit 72 protruding from the inner cover 68 is reduced.

In addition, in the latch mechanism 70, the operation unit 72 and the connection unit 78 are elastically deformed. Therefore, compared to a case where only the operation unit 72 is elastically deformed, the insertion space 72*a* is widened with a simple structure.

In addition, in the latch mechanism 70, one end of the connection unit 78 is rotatably connected to the operation unit 72. In this manner, when an excessive operation force is applied to the operation unit, compared to a case where the operation unit and the connection unit are connected not to be rotatable, excessive deformation of the connection unit 78 is suppressed.

In addition, in the latch device 102, the four fingertips of the operator are insertable into the insertion space 72*a* of the operation unit 72. In this manner, compared to a case where only three fingertips are inserted into the insertion space, operability of the operation unit 72 is improved.

In addition, in the image forming apparatus 10, in a state where the inner cover 68 is arranged at the closing position and the moving unit 92 is viewed in the apparatus depth direction, the moving unit 92 is arranged on the inner cover 68 side with respect to the conveyance path 16. Therefore, the moving unit 92 moving in the apparatus depth direction does not move to the conveyance path 16 side with respect to the inner cover 68.

Although the present disclosure has been described in detail with reference to specific exemplary embodiments, the present invention is not limited to the embodiments. The present invention will become apparent to those skilled in the art that various other embodiments can be adopted within the scope of the present invention. For example, in the above-described exemplary embodiment, the connection unit 78 is elastically deformed in a curved shape so that the movement in the apparatus width direction is changed to the movement in the apparatus depth direction. Alternatively, for example, the moving direction may be changed by using a link mechanism. In this case, an operational effect achieved by elastically deforming the connection unit 78 into a curved shape is not achieved.

In addition, in the above-described exemplary embodiment, the pair of connection units 78, the restriction unit 86, the moving unit 92, and the meshing unit 98 are arranged across one operation unit 72. Alternatively, the connection unit 78, the restriction unit 86, the moving unit 92, and the meshing unit 98 may be respectively provided one by one. In this case, an operational effect achieved by respectively providing the pair is not achieved.

In addition, in the above-described exemplary embodiment, the operation unit 72 is elastically deformed in a case where the operation force is applied to the operation unit 72. Alternatively, the operation unit 72 may not be elastically deformed. In this case, an operational effect achieved by elastic deformation of the operation unit is not achieved.

In addition, in the above-described exemplary embodiment, one end of the connection unit 78 is rotatably connected to the operation unit 72. Alternatively, one end of the connection unit 78 may be connected not to be rotatable. In this case, an operational effect achieved by being rotatably connected to the operation unit 72 is not achieved.

In addition, in the above-described exemplary embodiment, one operation unit 72 is provided in the pair of connection units 78 and the moving unit 92. Alternatively, the operation units may be respectively provided in the pair of connection units and the moving unit. However, in this case, an operational effect achieved by providing one operation unit 72 is not achieved.

In addition, in the above-described exemplary embodiment, the operation unit 72 is moved to one side in the apparatus width direction. Alternatively, the moving unit may be moved in the apparatus depth direction by moving the operation unit to the upper side or the lower side in the apparatus up-down direction.

In addition, in the above-described exemplary embodiment, the connection unit 78 is the resin component formed by using the resin material. Alternatively, as long as the moving direction can be changed, any material may be used. For example, spring steel or a wire may be used.

In addition, in the above-described exemplary embodiment, the restriction unit 86 restricts the moving direction of the other end of the connection unit 78 by using the through-hole 88*a*. Alternatively, a guide rail or a guide groove may be used.

In addition, in the above-described exemplary embodiment, the moving unit 92 is the resin component formed by using the resin material. Alternatively, the moving unit 92 may be a member extending in the apparatus depth direction, and may be a rod or a plate material.

In addition, in the above-described exemplary embodiment, the latch mechanism 70 is used in the image forming apparatus 10 using the electrophotographic method. Alternatively, for example, the latch mechanism 70 may be used in an image forming apparatus using an inkjet method, and may be used in an attaching/detaching member provided in a pre-treatment device or a post-treatment device of the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A latch mechanism comprising:
an operation unit;
a connection unit extending in one direction and having one end connected to the operation unit;
a restriction unit restricting the connection unit such that the other end of the connection unit moves to one side in the one direction, in a case where the operation unit is moved to one side in an intersecting direction intersecting with the one direction;
a moving unit connected to the other end of the connection unit, extending in the one direction, and moving from a first position to a second position as the other end of the connection unit moves;
a meshing unit meshing with the moving unit arranged at the first position, and releasing meshing with the moving unit arranged at the second position; and
a biasing unit that biases the moving unit to the first position.

2. The latch mechanism according to claim 1,
wherein the biasing unit biases the moving unit to the first position by generating a biasing force toward a direction that is away from the operation unit.

3. The latch mechanism according to claim 2,
wherein the connection unit includes a plurality of connection units in a pair, the restriction unit includes a plurality of restriction units in a pair, the moving unit includes a plurality of moving units in a pair, and the meshing unit includes a plurality of meshing units in a pair, and
one operation unit is arranged between the pair of the connection units, the pair of the restriction units, the pair of the moving units, and the pair of the meshing units.

4. The latch mechanism according to claim 3,
wherein the operation unit extends in the one direction, and
one of the connection units is connected to one end of the operation unit in the one direction, and the other of the connection units is connected to the other end of the operation unit in the one direction.

5. The latch mechanism according to claim 4,
wherein the operation unit is elastically deformed by applying an operation force to the operation unit.

6. The latch mechanism according to claim 3,
wherein the operation unit is elastically deformed by applying an operation force to the operation unit.

7. The latch mechanism according to claim 2,
wherein the operation unit is elastically deformed by applying an operation force to the operation unit.

8. The latch mechanism according to claim 2,
wherein the connection unit is elastically deformed in a case where the operation unit is moved to one side in the intersecting direction, and the other end of the connection unit moves to one side in the one direction.

9. The latch mechanism according to claim 1,
wherein the connection unit includes a plurality of connection units in a pair, the restriction unit includes a plurality of restriction units in a pair, the moving unit includes a plurality of moving units in a pair, and the meshing unit includes a plurality of meshing units in a pair, and
one operation unit is arranged between the pair of the connection units, the pair of the restriction units, the pair of the moving units, and the pair of the meshing units.

10. The latch mechanism according to claim 9,
wherein the operation unit extends in the one direction, and
one of the connection units is connected to one end of the operation unit in the one direction, and the other of the connection units is connected to the other end of the operation unit in the one direction.

11. The latch mechanism according to claim 10,
wherein the operation unit is elastically deformed by applying an operation force to the operation unit.

12. The latch mechanism according to claim 9,
wherein the operation unit is elastically deformed by applying an operation force to the operation unit.

13. The latch mechanism according to claim 9,
wherein the connection unit is elastically deformed in a case where the operation unit is moved to one side in the intersecting direction, and the other end of the connection unit moves to one side in the one direction.

14. The latch mechanism according to claim 1,
wherein the operation unit is elastically deformed by applying an operation force to the operation unit.

15. The latch mechanism according to claim 1,
wherein the connection unit is elastically deformed in a case where the operation unit is moved to one side in the intersecting direction, and the other end of the connection unit moves to one side in the one direction.

16. The latch mechanism according to claim 15,
wherein one end of the connection unit is rotatably connected to the operation unit.

17. A latch device comprising:
a main body;
an operation target attached to the main body; and
the latch mechanism according to claim 1, the latch mechanism holding the operation target at a predetermined position,
wherein an insertion space into which a fingertip of an operator is insertable is formed between the operation unit and the operation target.

18. The latch device according to claim 17,
wherein the operation unit extends in the one direction, and the fingertips of four fingers of the operator are insertable into the insertion space.

19. An image forming apparatus comprising:

a main body;

a conveyance unit provided inside the main body and conveying a recording medium along a conveyance path;

an image forming unit provided inside the main body and forming an image on the recording medium conveyed by the conveyance unit;

an opening unit serving as an operation target attached to the main body and rotationally moving between an opening position for opening the conveyance path to an outside and a closing position for closing the conveyance path; and a latch device according to claim 17, having a latch mechanism including the moving unit holding the opening unit at the closing position and arranged on an opening unit side with respect to the conveyance path in a case where the moving unit is viewed in a rotation axis direction of the opening unit, wherein the moving unit moves in the rotation axis direction as the one direction.

20. An image forming apparatus comprising:

a main body;

a conveyance unit provided inside the main body and conveying a recording medium along a conveyance path;

an image forming unit provided inside the main body and forming an image on a recording medium conveyed by the conveyance unit;

an opening unit attached to the main body and rotationally moving between an opening position for opening the conveyance path to an outside and a closing position for closing the conveyance path; and the latch mechanism according to claim 1, including the moving unit holding the opening unit at the closing position and arranged on an opening unit side with respect to the conveyance path in a case where the moving unit is viewed in a rotation axis direction of the opening unit, wherein the moving unit moves in the rotation axis direction as the one direction.

* * * * *